US009932846B2

(12) United States Patent
Todorovic

(10) Patent No.: US 9,932,846 B2
(45) Date of Patent: Apr. 3, 2018

(54) AEROENGINE SEALING ARRANGEMENT

(71) Applicant: ROLLS-ROYCE DEUTSCHLAND LTD & CO KG, Dahlewitz (DE)

(72) Inventor: Predrag Todorovic, Berlin (DE)

(73) Assignee: ROLLS-ROYCE DEUTSCHLAND LTD & CO KG, Dahlewitz (DE)

( * ) Notice: Subject to any disclaimer, the term of this patent is extended or adjusted under 35 U.S.C. 154(b) by 1144 days.

(21) Appl. No.: 14/081,335

(22) Filed: Nov. 15, 2013

(65) Prior Publication Data

US 2014/0140820 A1 May 22, 2014

(30) Foreign Application Priority Data

Nov. 22, 2012 (GB) .................................. 1220972.2

(51) Int. Cl.
*F01D 11/00* (2006.01)
*F01D 9/04* (2006.01)
*F01D 25/08* (2006.01)

(52) U.S. Cl.
CPC ............ *F01D 11/005* (2013.01); *F01D 9/042* (2013.01); *F01D 25/08* (2013.01); *F05D 2240/15* (2013.01); *Y02T 50/671* (2013.01); *Y02T 50/673* (2013.01); *Y02T 50/675* (2013.01)

(58) Field of Classification Search
CPC ........ F01D 11/005; F01D 9/042; F01D 25/08; F01D 25/246; F01D 25/243
See application file for complete search history.

(56) References Cited

U.S. PATENT DOCUMENTS 4,869,640 A 9/1989 Schwarz et al.
5,524,847 A 6/1996 Brodell et al.
6,942,452 B2 * 9/2005 Bruno .................... F01D 9/065 16/2.2
2004/0086379 A1 5/2004 Farrell et al.
2010/0080692 A1 * 4/2010 Tudor .................... F01D 9/042 415/139
2011/0167790 A1 * 7/2011 Cloft ........................ F02K 1/68 60/226.2

FOREIGN PATENT DOCUMENTS

EP 0 900 920 A2 3/1999
EP 1 762 704 A2 3/2007
EP 1 908 923 A1 4/2008
EP 2 204 539 A2 7/2010
WO WO 2007/030921 A1 3/2007

OTHER PUBLICATIONS

Jan. 30, 2014 Search Report issued in European Patent Application No. 13193015.
Mar. 20, 2013 Search Report issued in Great Britain Application No. GB1220972.2.

* cited by examiner

*Primary Examiner* — Woody Lee, Jr.
*Assistant Examiner* — Maxime Adjagbe
(74) *Attorney, Agent, or Firm* — Oliff PLC

(57) ABSTRACT

A bifurcation aerofoil having a leading edge portion and flanks where the leading edge portion is mounted to an inner wall of the bypass duct using a floating seal which permits circumferential movement of the leading edge. A cowl has a wall that provides the flanks of the aerofoil. On closing of the cowl into its flight position any contact between the flanks and the leading edge portion enables realignment of the leading edge portion to the inner wall of the bypass duct.

19 Claims, 4 Drawing Sheets

64
62
22
26
60
40

22
26
63
64
62
22
90
40

AEROENGINE SEALING ARRANGEMENT

TECHNICAL FIELD OF INVENTION

The invention relates to a floating seal and a sealing method for aerofoil-shaped structures to a fixed structure within a gas turbine engine. The invention finds particular application for aerofoil bifurcations within a bypass duct of a gas turbine engine

BACKGROUND OF INVENTION

Civil aircraft gas turbine engines are mounted to aircraft sub-structures through a pylon. The engines typically comprise an engine core surrounded by an aerodynamic nacelle. A fan at the engine inlet pushes a large volume of air through a bypass duct defined between the engine core and the nacelle. The pylon extends through the bypass duct and is located within an aerodynamically formed fairing that is known in the industry as a bifurcation that smooths the air flow through the bypass duct around the mounting structure.

The nacelles typically have cowls that move relative to the engine core to allow access to the engine core. The cowls are arranged to abut fixed sections within the engine and a seal is required between the fixed section in the bypass duct and the cowl.

Cowling doors can be large components and forming a repeatable seal that can be made, broken and remade has proved difficult. In particular, rigidly fixing the bifurcation aerofoil to the engine structure can, when the cowl doors are closed, lead to gaps giving poor sealing between the bifurcation aerofoil and the cowl door, or excessive pressure on the bifurcation leading edge that can damage the component. The radial join and existing manufacturing and assembly tolerances along with aero and inertia loads creates steps and gaps that are significant drag generators to the flow in the bypass duct.

It is an object of the present invention to seek to provide an improved sealing arrangement.

STATEMENTS OF INVENTION

According to a first aspect of the invention there is provided a sealing joint between an aerofoil and a wall of a bypass duct on a gas turbine engine, wherein the aerofoil extends radially across the bypass duct and can move circumferentially with respect to the wall; wherein the aerofoil has a circumferentially extending sealing element that cooperates with a seal element on the wall to provide the sealing joint; wherein the sealing joint is maintained on circumferential movement between the duct wall and the aerofoil.

Axial alignment of the cowling and the aerofoil may be provided by a radially extending groove which engages a flange protruding from the cowling. Advantageously this axial alignment connection is easily assembled and disassembled. The cowl may move radially with respect to the aerofoil.

Preferably the sealing element is a lip integral with a fixed part of the aerofoil which can also have a moveable part. The fixed part is preferably the leading and/or trailing edge. The moveable part may be the aerofoil flanks that may be moveable with the cowling. The duct wall seal element may comprise a channel defined between a wall of the duct wall and a seal retainer.

Preferably the sealing element is locatable between the wall and the seal retainer. The channel may have a first flexible seal member on the wall and a second flexible seal member on the seal retainer.

Preferably the first flexible seal member seals against a first surface of the sealing element and the second flexible seal member seals against a second surface of the sealing element.

The duct wall is preferably part of the radially inner wall of the bypass duct or part of the radially outer wall of the bypass duct.

The aerofoil may comprise a leading edge portion and a first and second flank extending from the leading edge portion. The leading edge portion may be detachable from and attachable to one or more of the first and second flanks.

The leading edge portion preferably has a radially extending groove towards its axially rearward edge. The groove may have a "V" cross section and each flank may have a corresponding radially extending flange that is located within the groove when the flank is attached to the leading edge portion.

The flanks are preferably provided by walls extending between a surface defining part of the outer periphery of the bypass duct and a surface defining part of the inner periphery of the bypass duct.

The mounting structure preferably carries a cowling comprising portions of the radially inner wall and the radially outer wall of the bypass duct and the first and second flanks. The cowling may be in two sections each separately mounted to the mounting structure, wherein each structure comprises a portion of the radially inner wall and a portion of the radially outer wall and either the first or second flanks.

Each section may be mounted to the mounting structure through a hinge that permits rotation of the cowling section away from the engine.

Alternatively, the aerofoil may be located around a drive shaft that extends across the bypass duct of a gas turbine between an engine core and an auxiliary gearbox. This aerofoil is known as the lower bifurcation.

The aerofoil may have a sealing element towards both its radially inner and radially outer extents.

Advantageously, the arrangement permits the aerofoil to move relative to the duct wall in a transverse direction and/or a radial direction. The movement permits a loose installation of the aerofoil to the duct wall that increases the tolerance of the components in manufacture and aids installation by providing a self aligning effect.

DESCRIPTION OF DRAWINGS

The invention will now be described, by way of example only, with reference to the accompanying drawings in which.

DETAILED DESCRIPTION OF INVENTION

Figure 1:
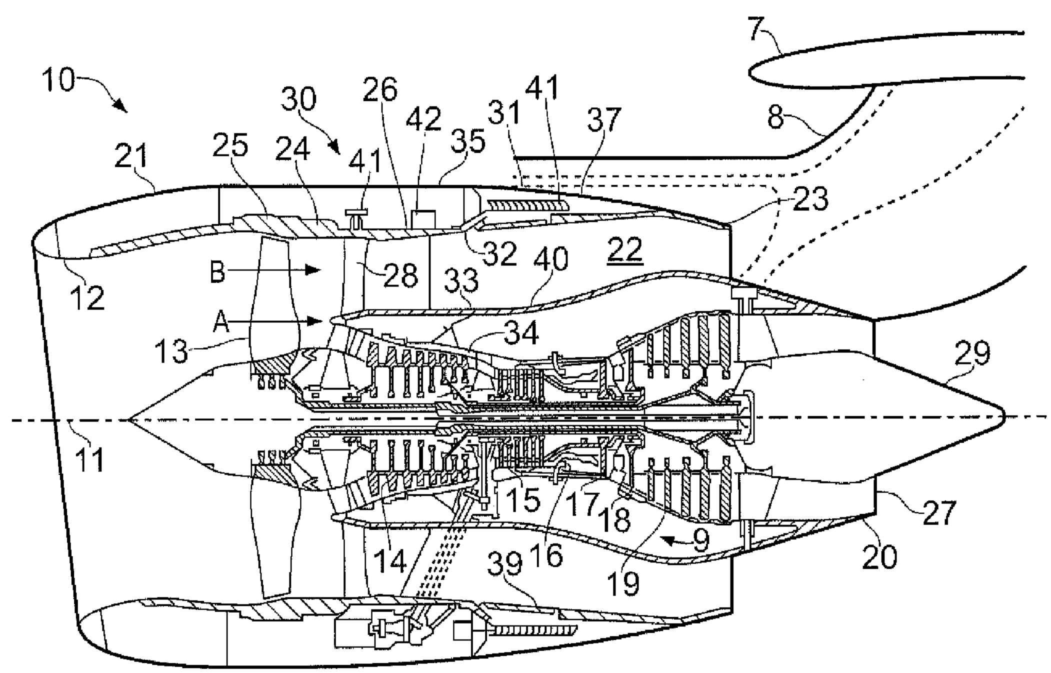
FIG. 1 depicts an exemplary ducted gas turbine.

Referring to FIG. 1, a ducted fan gas turbine engine generally indicated at 10 has a principal and rotational axis 11. The engine 10 comprises a propulsive fan 13 and a core engine 9 having, in axial flow series, an air intake 12, an intermediate pressure compressor 14, a high-pressure compressor 15, combustion equipment 16, a high-pressure turbine, an intermediate-pressure turbine 18, a low-pressure turbine 19 and terminating with a core exhaust nozzle 20. A nacelle 21 generally surrounds the engine 10 and defines the intake 12, a bypass duct 22 and an exhaust nozzle 23.

The gas turbine engine 10 works in the conventional manner so that air entering the intake 12 is accelerated by the fan 13 to produce two air flows: a first airflow A into the intermediate pressure compressor 14 and a second airflow B which passes through a bypass duct 22 to provide propulsive thrust. The intermediate pressure compressor 14 compresses the airflow A directed into it before delivering that air to the high pressure compressor 15 where further compression takes place.

The compressed air exhausted from the high pressure compressor 15 is directed into the combustor 16 where it is mixed with fuel and combusted. The resultant hot combustion products then expand through, and thereby drive, the high, intermediate and low-pressure turbines 17, 18, 19 before being exhausted through the nozzles 20 to provide additional propulsive thrust. The high, intermediate and low pressure turbines 17, 18, 19 respectively drive the high, intermediate pressure compressors 15, 14 and the fan 13 by suitable interconnecting shafts.

A centre plug 29 is positioned within the core exhaust nozzle 20 to provide a form for the core gas flow A to expand against and to smooth its flow from the core engine. The centre plug 29 extends rearward of the cone nozzle's exit plane 27.

The fan is circumferentially surrounded by a structural member in the form of a fan casing 24 which is supported by an annular array of outlet guide vanes 28. The fan casing 24 comprises a rigid containment casing 25 and attached rearwardly thereto is a rear fan casing 26.

The gas turbine engine 10 is installed under an aircraft wing 7 via a pylon 8. The nacelle 21 comprises an axially forward cover 35 and a translatable cowl 37. Both the cover and the cowl are provided by C-shaped openable doors with each door being separately hinged to the aircraft pylon 8. The nacelle has a thrust reverser unit 31 which is formed from a number of cascade panels arranged sequentially around the circumference of the engine 10. The hinged doors permit access to the engine core for maintenance or inspection purposes.

Figure 2:
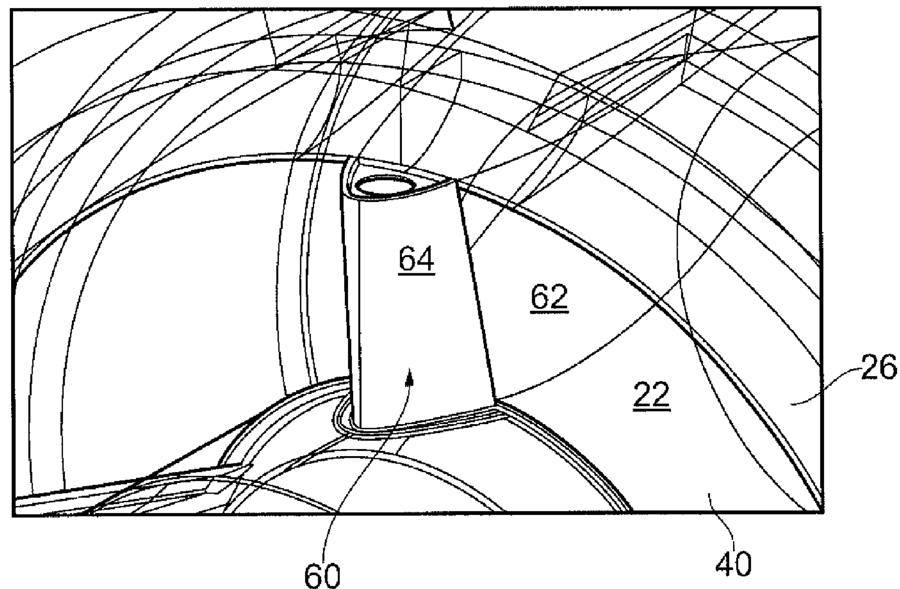
FIG. 2 shows a view of the bypass duct with a bifurcation aerofoil with closed cowling.
Figure 3:
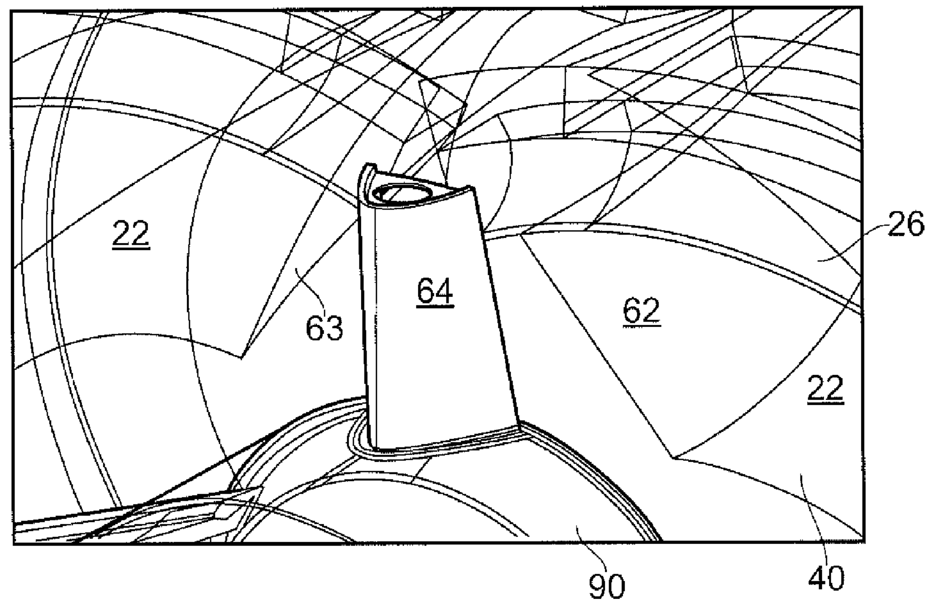
FIG. 3 depicts the bypass duct of FIG. 2 with open cowling

A bifurcation aerofoil 60 surrounds the pylon mounting structure as it extends across the bypass duct 22 as shown in FIG. 2. The aerofoil has side panels 62, 63 and a floating leading edge portion 64 which together enclose a volume that contains mechanical struts, engine mounts, cabling, and pipework through to the engine core. The aerofoil presents a smooth surface to the flow through the bypass duct to minimise flow disruptions and pressure loss.

The cowling 26, 40 is connected by a hinge to the pylon that allows the cowling to be opened by rotating it away from the engine about the hinge. The rotation allows access to the engine core for maintenance or inspection. In the embodiment shown the radially inner wall of the bypass duct 40 and the radially outer wall 26 of the bypass duct are connected by walls 62 and 63 that forms the side panels of the bifurcation aerofoil.

Efficiency of the engine is kept high by minimising air loss within the engine to ensure that the maximum amount of air possible can be used to generate thrust. Minimising drag and aerodynamic losses is also important. A seal is therefore provided between the cowling and the aerofoil that inhibits air loss from the bypass duct.

The leading edge portion is 64 is loosely connected to the outlet guide vane outer casing and inner casing 92 to permit limited axial and circumferential or transversal movement. By allowing the leading edge to float the manufacturing tolerance can be relaxed. Cowling doors can be large components—up to four meters in diameter—and forming a repeatable seal that can be opened and closed has proved difficult.

Figure 4:
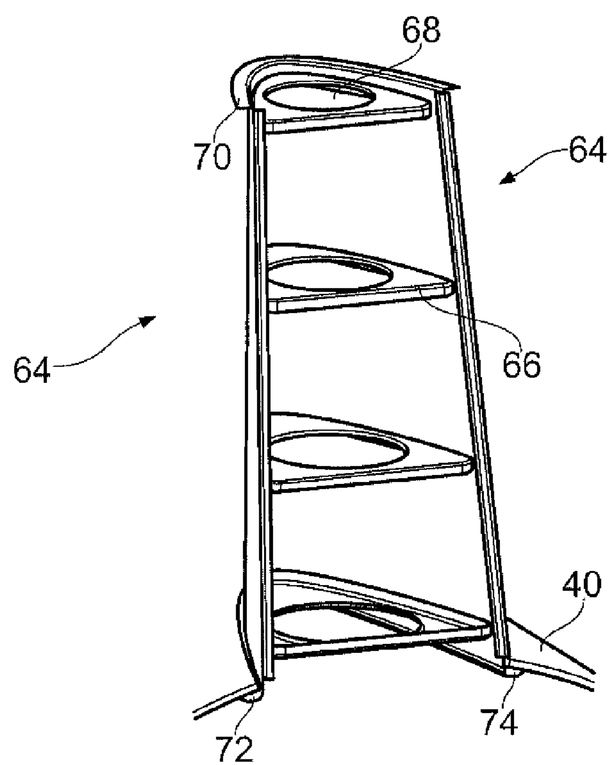
FIG. 4 depicts a rear view of the leading edge of the bifurcation aerofoil.

Shown in FIG. 4, the bifurcation leading edge 64 is a lightweight, thin walled component of metal or composite that is reinforced with a plurality of stiffening ribs 66. The ribs have holes 68 through which cabling and pipework can pass, or just for the weight reduction purpose.

Towards the radially inner and radially outer extent of the bifurcation leading edge 64 a lip 72 is provided. The lip extends both axially and circumferentially and advantageously acts both to stiffen the edge of the aerofoil and also to provide a sealing feature which cooperates with a further sealing feature on the outlet guide vane inner casing 90.

Figure 5:
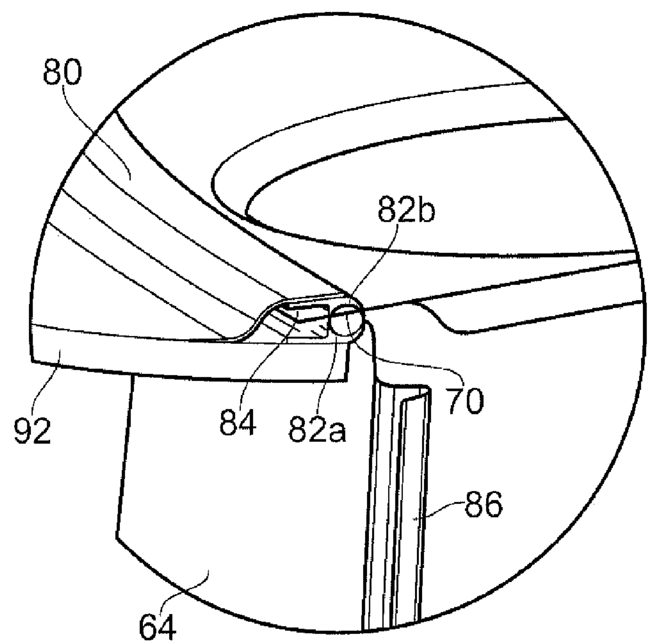
FIG. 5 is a view of the sealing joint between the aerofoil and the radially outer cowl wall.

FIG. 5 shows an exemplary seal between the radially outer end of the bifurcation leading edge 64 and the outlet guide vane casing 92. It is to be understood that a corresponding seal may be provided between the radially inner end of the bifurcation leading edge 64 and the radially inner outlet guide vane casing 90. Floating point fasteners (not shown) may be used to limit the movement of the leading edge with respect to the casings of the outlet guide vane.

The casing 92 which forms part of the outer wall of the bypass duct has a seal retainer 80 on the side of the wall that does not form the inner surface of the bypass duct. The seal retainer is cantilevered from the casing to define a channel which holds a flexible seal member. The flexible seal member is formed in two halves and mounted between the seal retainer and the casing 92, one half mounted 82*a* to the casing and one half to the seal retainer 82*b*. The two halves of the flexible member abut each other but flex to allow the bifurcation lip to separate them.

Advantageously, this creates a convoluted seal where any air that escapes through the seal has to pass across two flexible members and around the bifurcation lip 70 before exiting the bypass duct 22.

A portion 84 of the lip 70 protrudes through the flexible members 82*a*, 82*b*. The lip can therefore be imprecisely located axially and circumferentially whilst still providing the required seal. Advantageously, the bifurcation aerofoil leading edge can therefore be loosely located onto the engine with a permitted degree of circumferential or axial movement that reduces the risk of damage to the part.

The rear of the leading edge 64 of the bifurcation aerofoil is provided with grooves 86 as receptacles for male elements that are provided on the cowling side walls 62, 63. One groove is provided for each flank but it will be appreciated that multiple flanges may be provided on each flank which will require multiple grooves on each side of the leading edge portion. When the cowl is closed the male elements, which are preferably flanges extending from the cowling, locate within the grooves on the leading edge portion. This both seals the cowling in place and locates the leading edge axially against the cowl. Where the cowl induces movement of the leading edge the movement is enabled by the floating nature of the seal joint and realignment of the leading edge with the outlet guide vane casing structures is enabled in a simple and elegant manner whilst maintaining the sealing joint. Use of a "V" shaped groove advantageously helps locate the leading edge portion 64 axially to the outlet guide vane casing. As the flange contacts the groove surface the force of the closing cowl moves the leading edge portion axially forward or rearward depending on whether the flange contacts the axially forward or axially rearward surface of the groove. The floating join between the aerofoil leading edge and the outlet guide vane casing maintaining the seal despite the axial and/or circumferential movement.

Figure 6:
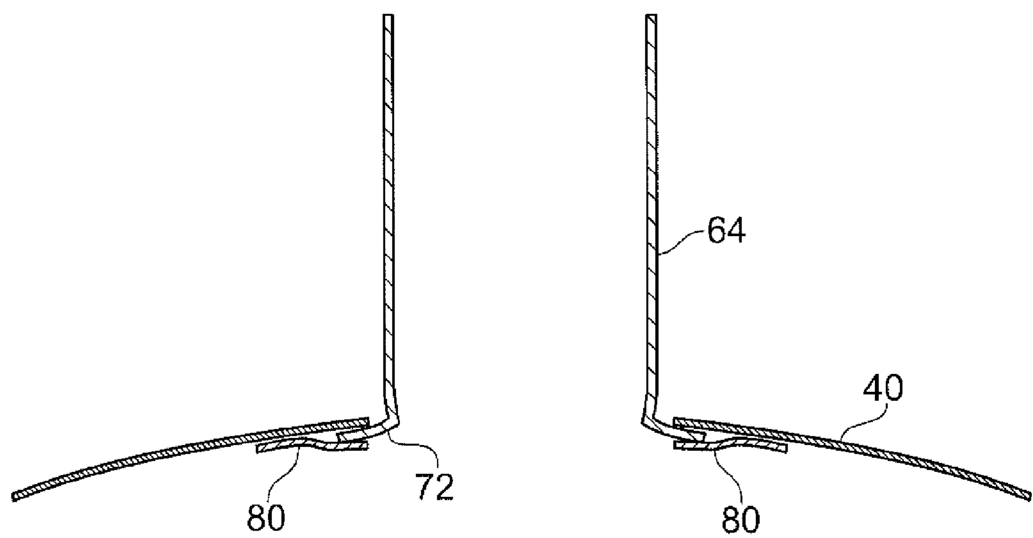
FIG. 6 is a cross-section of the sealing joint of FIG. 5

FIG. 6 depicts a schematic of a seal for the radially inner wall of the bypass duct that is of a similar arrangement to that of FIG. 5. The bifurcation leading edge 64 has a lip 72 that is located between a seal retainer 80 and the inner wall 40. The flexible seal members are not shown for clarity.

With this self-alignment effect, steps and gaps normal to the air flow direction are minimised with a similar reduction in drag. The steps and gaps around the groove 86 and flange joint can change but with a minor effect on the overall drag partially because over those corners integration angle wake is already generated. It will be appreciated that with this invention drag issue of the joint line is reduced and its variation is moved towards the area at which there is already a wake generated. Integration of the drag sources gives less total drag than the separate drag sources.

Further, if elements of the engine have to be routed through the bifurcation's leading edge 64, reinforcing ribs 66 could be split into multiple parts, to provide sufficient access.

It will be apparent that the invention can also apply to trailing edges of the bifurcation aerofoils which can also be loosely located onto the engine. The trailing and leading edges of the bifurcation duct may therefore move independently of each other as the cowl is opened and closed.

As discussed earlier the bifurcation aerofoil may also enclose other structures than the pylon mounting structure. For example, it may surround drive shafts from the accessory gearbox. The invention may be used on multiple bifurcation aerofoils that extend across the bypass duct.

Although described with respect to aerofoils in bifurcation duct of a gas turbine it will be appreciated that the invention could also be applied to other aerofoil structures that require such a floating sealing joint.

The invention claimed is:

1. A sealing joint between an aerofoil and a wall of a bypass duct on a gas turbine engine, the aerofoil being configured to extend radially across the bypass duct such that the aerofoil can move circumferentially with respect to the duct wall, the sealing joint comprising:

a circumferentially extending sealing element on the aerofoil; and a duct wall seal element on the duct wall, the duct wall seal element being configured to cooperate with the sealing element to provide the sealing joint, wherein:

the sealing joint is maintained with axial or circumferential movement between the duct wall and the aerofoil, and the aerofoil includes a leading edge portion, a first flank, and a second flank, the first flank and the second flank extending from the leading edge portion, the leading edge portion being attachable to and detachable from the first flank and the second flank.

2. The sealing joint according to claim 1, wherein the sealing element is a lip that is integral with the aerofoil.

3. The sealing joint according to claim 2, wherein the duct wall seal element comprises a channel defined between the duct wall and the duct wall seal element.

4. The sealing according to claim 3, wherein the sealing element is located between the duct wall and the duct wall seal element, and the channel has a first flexible seal member on the duct wall and a second flexible seal member on the duct wall seal element.

5. The sealing joint according to claim 4, wherein when the sealing element is located in the channel such that the first flexible seal member seals against a first surface of the sealing element and the second flexible seal member seals against a second surface of the sealing element.

6. The sealing joint according to claim 5, wherein the duct wall is a radially inner wall of the bypass duct.

7. The sealing joint according to claim 1, wherein the sealing element is a lip that is integral with the aerofoil and that is located within a channel defined between the duct wall and the duct wall seal element.

8. The sealing joint according to claim 7, wherein the channel has a first flexible seal member on the duct wall and a second flexible seal member on the duct wall seal element, the first flexible seal member sealing against a first surface of the sealing element and the second flexible seal member sealing against a second surface of the sealing element.

9. The sealing joint according to claim 1, wherein the leading edge portion has a radially extending groove.

10. The sealing joint according to claim 9, wherein the first flank and the second flank each have a flange that is located within the groove when each flank is attached to the leading edge portion.

11. The sealing joint according to claim 10, wherein the sealing element is a lip that is integral with the aerofoil and that is located within a channel defined between the duct wall and the duct wall seal element.

12. The sealing joint according to claim 11, wherein the channel has a first flexible seal member on the duct wall and a second flexible seal member on the duct wall seal element, the first flexible seal member sealing against a first surface of the sealing element and the second flexible seal member sealing against a second surface of the sealing element.

13. The sealing joint according to claim 12, wherein each flange contacts a surface of the groove to axially position the leading edge portion to the duct wall.

14. The sealing joint according to claim 1, wherein the aerofoil surrounds a mounting structure mounting an engine core to an aircraft.

15. The sealing joint according to claim 14, wherein the wherein the duct wall is a radially inner wall of the bypass duct, and the mounting structure carries a cowling comprising a further part of the radially inner duct wall, part of a radially outer duct wall and one or more of the first and second flanks.

16. The sealing joint according to claim 15, wherein the cowling is mounted to the mounting structure through a hinge that permits rotation of the cowling away from the engine.

17. The sealing joint according to claim 1, wherein the aerofoil surrounds a drive structure connecting an engine core to a gearbox.

18. The sealing joint according to claim 1, wherein the aerofoil has radially inner and radially outer extents and a second sealing element towards both its radially inner and radially outer extents.

19. The sealing joint according to claim 1, wherein the sealing joint includes the aerofoil and the bypass duct.

* * * * *